United States Patent
Hagar

[15] 3,636,971
[45] Jan. 25, 1972

[54] GATE VALVE

[72] Inventor: Donald K. Hagar, Macungie, Pa.
[73] Assignee: Mosser Industries, Incorporated
[22] Filed: Sept. 25, 1970
[21] Appl. No.: 75,498

[52] U.S. Cl. ............................................137/238, 251/205
[51] Int. Cl. ..........................................................F16k 3/34
[58] Field of Search................137/237, 238, 242, 244, 546; 251/205, 326, 327, 359

[56] References Cited

UNITED STATES PATENTS

| | | | |
|---|---|---|---|
| 1,769,386 | 7/1930 | Orton | 251/326 |
| 2,596,817 | 5/1952 | McGovney | 251/326 X |
| 2,851,051 | 9/1958 | Englert et al. | 137/242 |
| 3,190,305 | 6/1965 | Schulze | 251/205 X |

Primary Examiner—M. Cary Nelson
Assistant Examiner—David R. Matthews
Attorney—John W. Behringer

[57] ABSTRACT

A gate valve with a self-flushing function for use in a pipeline in which solid material or particles are dispersed or entrained in a fluid is disclosed. The valve is composed of a housing having inlet and outlet ports defining an opening and a slidable gate adapted to move vertically in a channel in the interior wall of the housing so as to open or block the opening. A depression is provided in the top edge of each of the opposite walls of the channel, and the bottom edge of the gate contains recesses in correspondence with the depressions. As the slidable gate is lowered, the recesses and depressions will correspond to form an opening on the inlet side and an opening on the outlet side of the gate as the gate otherwise blocks the opening defined by the inlet and outlet ports. The fluid in the pipeline enters the opening formed in the inlet side, flows under the bottom edge of the gate and exits the opening formed in the outlet side and during the traverse under the gate flushes away any solid material clogging the channel below the level of the opening.

10 Claims, 7 Drawing Figures

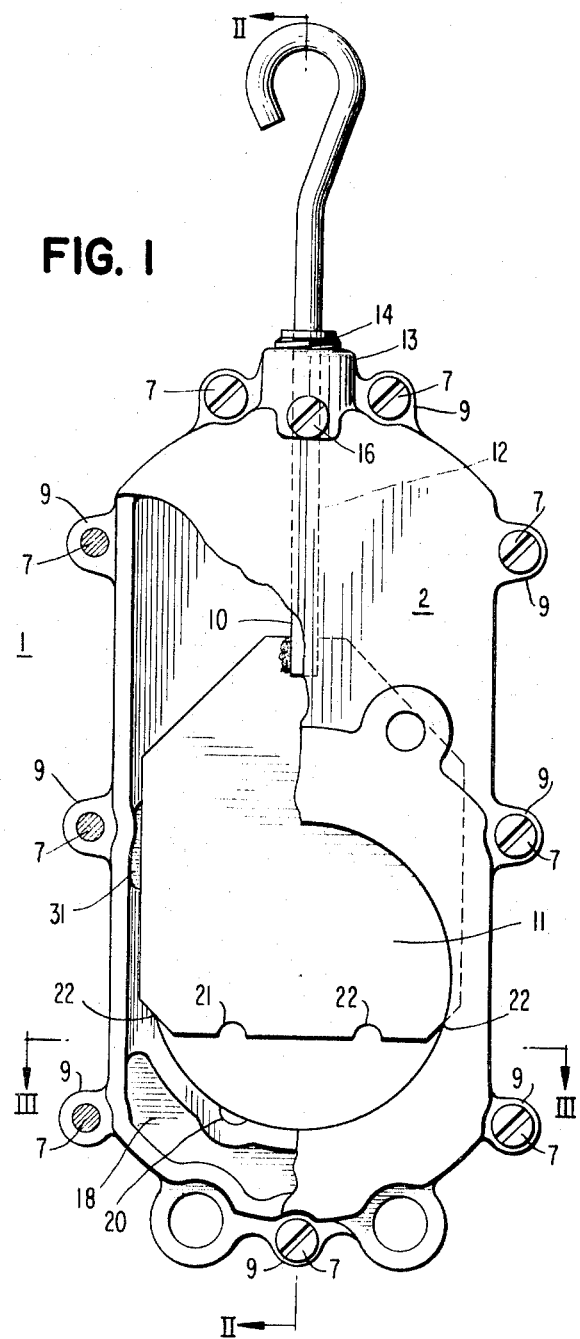
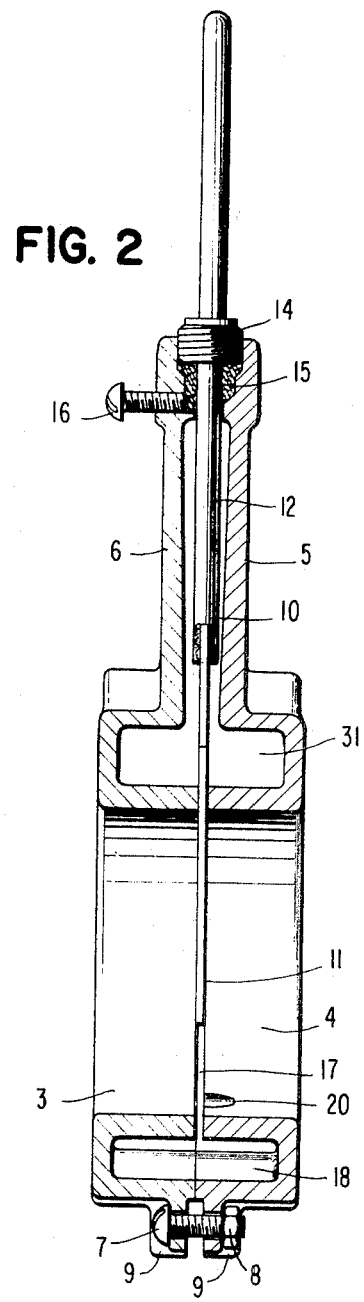
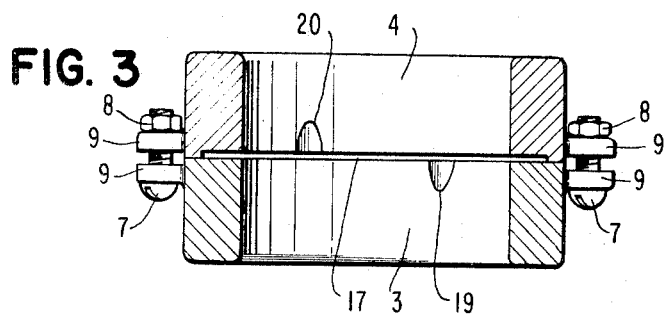

GATE VALVE

This invention relates to gate valves, either one-way or two-way valves, and is particularly directed to a valve adapted to control the flow of the fluid stream which may contain solid material, which solid materials may tend to interfere with the proper operation and sealing of the valve gate. The valve of the present invention is applicable for use in a fluid pipeline in which solid materials are normally present, as in a gas-solid or liquid-solid mixture product line or in a fluid line in which there are entrained solid particles, such as sand, products of corrosion, scale or other foreign materials.

It is well known that in the moving of any fluid in a pipeline in which there are dispersed or entrained solid materials, that these solid materials may interfere with the proper operation of the gate valves used to control the flow in the various lines. For example, it has been found that solid materials will tend to collect or lodge in the grooved valve seat of a typical gate valve, so that when the valve member is being closed, the solids can be pressed between the valve and the seat, preventing the valve from being entirely closed. Some materials, e.g., pulp-type materials, can lodge in the groove in this manner and eventually form a tenacious, cementlike mass that interferes with both the opening and closing of the valve.

Gate valves have also been proposed with an internal cavity below and in correspondence with the grooves of the valve seat into which the solid material can collect. As the internal cavity fills with solid material, however, the sealing problem is again created and the valves must be taken out of use and cleaned periodically to maintain their effectiveness.

The gate valve of this invention is especially adapted for controlling the flow of fluid media containing solid materials and provides a self-flushing function, thus allowing proper seating and opening of the valve in continuous use.

The invention will be further described with reference to the accompanying drawings in which:

FIG. 1 is a partial cutout front view of the gate valve of this invention;

FIG. 2 is a traverse section taken through line II—II in FIG. 1;

FIG. 3 is a longitudinal section taken through line III—III in FIG. 1;

Figure 4:
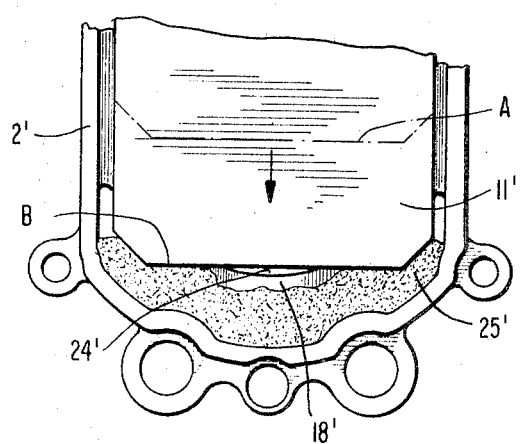
FIG. 4 is a partial front view in section of a prior art gate valve.

Referring to the Figures, there is shown a gate valve generally indicated as 1 composed of a housing generally indicated as 2, containing an inlet port 3 and an outlet port 4. As illustrated herein, the housing 2 is composed of two body sections 5 and 6 joined by suitable joining means, such as nuts 7 and bolts 8, which can be joined through integral flanges 9 on each of the body sections 5 and 6. The gate valve further is composed of a slidable gate 10 having a plate portion 11 of a size larger than the opening created by the inlet port 3 and outlet port 4 and a shank portion 12 extending through the housing through upper cap casing 13 in slidable cooperation therewith. As shown therein, upper cap casing 13 can consist of a nut 14 threaded into the housing and suitable packing material 15. The slideable gate 10 can be made from one-piece material or the shank portion 12 and plate portion 11 can be manufactured separately and integrally joined together by suitable means, such as welding, brazing or the like. The plate portion 11 can be formed in any suitable shape, e.g., circular, square, rectangular, etc. It is preferred that the plate portion 11 be essentially rectangular with beveled corners 22 on the bottom edge of the plate portion 11. The upper part of the plate portion 11 can also be beveled so long as the plate portion 11 when lowered to a closed position provides a surface completely blocking the opening defined by the inlet port 3 and outlet port 4. The height of the slidable gate 10 can be maintained at any particular level by suitable means such as set screw 16.

The housing 2 further defines a channel 17 in the walls of the housing 2 in which the slidable gate slides. An internal cavity 18 can also be provided in the bottom of the housing 2 as the bottom region of the channel. It may facilitate casting operations if the top of the housing 2 is also provided with an internal cavity 31 also in communication with channel 17. As is well known in the art, uniform wall thickness is desirable when forming cast metal objects.

Inlet port 3 is provided with relief port or depression 19 extending from channel 17 partially but less than the full length of the inlet port 3 and generally formed in the top edge of the channel wall near the bottom of the housing. The shape of depression 19 is not critical but it is preferred that it be arcuate and that it taper from the channel back to the floor of the port 3. The depression 19 is located between about 3 and 6 o'clock on the edge of the channel, preferably between about 3 and 5:30, or even 4 and 5:30 o'clock. A similar depression 20 of a similar size and shape is formed in the outlet port 4. The depression 20 is advantageously located the same angular distance from the vertical centerline of the opening defined by the inlet port 3 and the outlet port 4 but on the opposite side, e.g., between about 6 and 9 o'clock, preferably between about 6:30 and 9, or even 6:30 and 8, o'clock.

The slidable gate 10 contains cutout portions or recesses 21 and 22 in plate portion 11 corresponding to, i.e., vertically aligned with, depressions 19 and 20 and providing a self-flushing operation as described below. Recesses 21 and 22 are advantageously of the same shape as depressions 19 and 20, i.e., arcuate. These recesses in the bottom edge of the gate, which is otherwise preferably substantially straight, provide communicating openings on the inlet and outlet sides of the slide gate when the plate portion 11 of slidable gate 10 otherwise completely blocks the opening defined by the inlet port 3 and outlet port 4, i.e., when the gate is partially closed so that that portion of the gate's bottom edge which extends between recesses 21 and 22 is below the top edges of the walls of the channel 17.

FIG. 4 illustrates the prior art. Shown therein is a slidable gate 11' in housing 2' attempting to close opening 24'. The internal cavity 18' contains solid material 25' lodged therein. As the slideable gate 11' is lowered from position A to position B, the solid material may compress to some extent, dependent on its nature, but can eventually be present in an amount sufficient to prevent full closure of the gate and to subject the gate and the housing to excessive wear.

Figure 5:
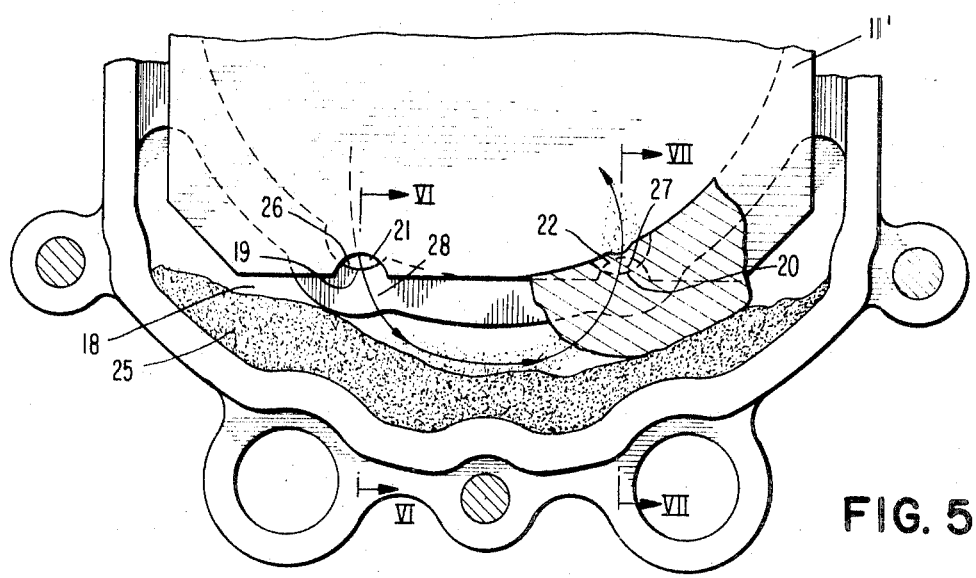
FIG. 5 is a partial front view in section of the gate valve of the instant invention.
Figure 6:
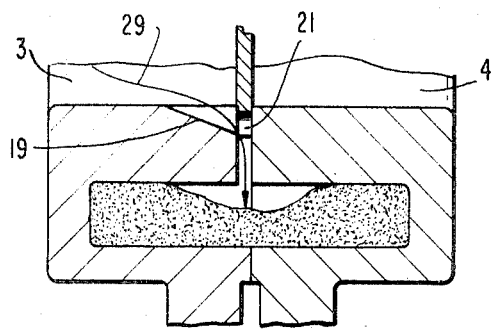
FIG. 6 is a partial section taken through line VI—VI in FIG. 5.
Figure 7:
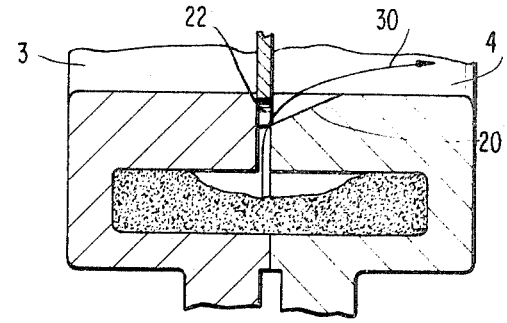
FIG. 7 is a partial section taken through line VIII—VIII in FIG. 5.

FIG. 5 illustrates a similar situation with the gate valve of the instant invention. Shown therein is solid material 25 in the internal cavity 18. Solid material may also be present in channel 17 in the area adjacent to the internal cavity. As the slidable valve is being closed, the recesses 21 and 22 on the slide gate 11 in correspondence with depressions 19 and 20 provide openings 26 and 27 on the inlet side and outlet side of the slide gate, respectively, as the slide gate 11 otherwise closes the opening of the inlet port 3 and outlet port 4. The fluid material in the inlet port 3 passes through opening 26, passes under the bottom edge of slide gate 11 via the passageway defined by the bottom edge of the gate and the opposite walls of the channel 17, and leaves the passageway via opening 27, as indicated by arrows 28, 29 and 30. The passage of the fluid cleans out the solid material in the channel 17 adjacent to internal cavity 18 sufficiently to allow full seating of the slide gate 11, and flushes the material out through the outlet port 4.

The formation of openings 26 and 27 by the correspondence of recesses 21 and 22 depressions 19 and 20 occurs as the slidable gate is being lowered. When the slidable gate is fully closed the openings disappear. These openings are thus only momentarily present. However, the formation of these openings functions to clean out any solid materials in the groove or channel in the bottom of the housing and in the internal cavity. Some solid material may remain in the groove or internal cavity but, regardless, the flushing action provided by the valve of the present invention cleans out at least enough material to allow proper seating of the slide gate. The flushing action, described above, will be repeated every time the valve is closed.

I claim:

1. In a gate valve having a housing with inlet and outlet ports and a gate having a bottom edge and being vertically slidable between said ports in a continuous channel formed in the interior wall of the housing, said channel being defined by two opposite walls and a bottom, and said channel extending across the bottom of said housing for receiving the gate when said gate is in a closed position, the improvement wherein one wall of the channel has a depression in its top edge somewhere in the region between 3 and 6 o'clock on said edge, the opposite wall has a depression in its top edge somewhere in the region between 6 and 9 o'clock thereon, and the bottom edge of the gate has two recesses, one of said recesses being vertically aligned with one of said depressions and the other of said recesses being vertically aligned with the other of said depressions, said alignment of said recesses with said depressions providing, when the gate is partially closed so that that portion of the gate's bottom edge which extends between said recesses is below the top edges of the walls of the channel, a passageway between said depressions, said passageway being defined by the walls of the channel and the bottom edge of the gate and constituting a conduit for the passage of fluid from the inlet port, beneath the bottom edge of the gate and into the outlet port.

2. The improvement of claim 1 wherein the bottom edge of the gate is, except for the recesses therein, substantially straight.

3. The improvement of claim 2 wherein the interior wall of the housing is substantially round.

4. The improvement of claim 3 wherein the depression in the top edge of one of the channel walls is somewhere in the region between 4 and 5:30 o'clock and the depression in the top edge of the other channel wall is somewhere in the region between 6:30 and 8 o'clock.

5. The improvement of claim 4 wherein the depressions and recesses are arcuate in shape.

6. The improvement of claim 5 wherein the bottom portions of the channel walls are further apart from one another than are the top portions of those walls, thus defining a cavity in the bottom of the channel for retention of deposited solids.

7. The improvement of claim 1 wherein the interior wall of the housing is substantially round.

8. The improvement of claim 1 wherein the depression in the top edge of one of the channel walls is somewhere in the region between 4 and 5:30 o'clock and the depression in the top edge of the other channel wall is somewhere in the region between 6:30 and 8 o'clock.

9. The improvement of claim 1 wherein the depressions and recesses are arcuate in shape.

10. The improvement of claim 1 wherein the bottom portions of the channel walls are further apart from one another than are the top portions of those walls, thus defining a cavity in the bottom of the channel for retention of deposited solids.

* * * * *